US005893913A

United States Patent [19]
Brodsky et al.

[11] Patent Number: 5,893,913
[45] Date of Patent: Apr. 13, 1999

[54] METHOD FOR SYNCHRONIZING CLASSES, OBJECTS, ATTRIBUTES AND OBJECT PROPERTIES ACROSS AN OBJECT-ORIENTED SYSTEM

[75] Inventors: Stephen Andrew Brodsky, Los Gatos; Timothy James Grose, San Jose; Roni Korenshtein, Los Gatos, all of Calif.

[73] Assignee: International Business Machines Corporation, Armonk, N.Y.

[21] Appl. No.: 08/747,415

[22] Filed: Nov. 12, 1996

[51] Int. Cl.$^6$ .................................................. G06F 17/30
[52] U.S. Cl. .......................... 707/201; 707/103; 707/1; 707/8; 345/350; 364/489; 395/683
[58] Field of Search ................................ 707/103, 201, 707/1, 8; 1/1; 395/683; 364/489; 345/350

[56] References Cited

U.S. PATENT DOCUMENTS

| | | | |
|---|---|---|---|
| 4,845,665 | 7/1989 | Heath et al. | 345/333 |
| 5,247,651 | 9/1993 | Clarisse | 395/500 |
| 5,257,363 | 10/1993 | Shapiro et al. | 395/500 |
| 5,315,709 | 5/1994 | Alston, Jr. et al. | 707/6 |
| 5,325,533 | 6/1994 | McInerney et al. | 395/701 |
| 5,390,320 | 2/1995 | Smithline | 395/500 |
| 5,390,330 | 2/1995 | Talati | 395/703 |
| 5,421,015 | 5/1995 | Khoyi et al. | 395/677 |
| 5,437,037 | 7/1995 | Furuichi | 395/707 |
| 5,511,196 | 4/1996 | Shackelford et al. | 395/683 |
| 5,515,497 | 5/1996 | Itri et al. | 345/340 |
| 5,528,503 | 6/1996 | Moore et al. | 364/468.01 |
| 5,537,630 | 7/1996 | Berry et al. | 345/326 |
| 5,542,040 | 7/1996 | Chang et al. | 345/326 |
| 5,551,028 | 8/1996 | Voll | 707/103 |
| 5,555,201 | 9/1996 | Dangelo et al. | 364/489 |
| 5,555,365 | 9/1996 | Selby et al. | 345/335 |
| 5,555,370 | 9/1996 | Li et al. | 345/334 |
| 5,557,518 | 9/1996 | Rosen | 380/24 |
| 5,570,281 | 10/1996 | Berry | 364/146 |
| 5,615,362 | 3/1997 | Jensen et al. | 707/103 |
| 5,684,984 | 11/1997 | Jones et al. | 707/10 |

OTHER PUBLICATIONS

Citrin, Wayne, et al., "Using Formalized Temporal Message-flow Diagrams," *Software–Practice and Experience*, vol. 25, No. 12, pp. 1367–1401, Dec. 1995.

Coats, Mark, et al., "Constructing Operational Specifications," *Dr. Dobb's Journal of Software Tools for Professional Programmer*, vol. 20, No. 6, pp. 18–33, Jun. 1995.

De Man, Josef, et al., "Towards a formal Semantics of Message Sequence Charts", *SDL 93 Using Objects. Proceedings of the Sixth SDL Forum 1993*, pp. 157–165, 1993.

Ek, Anders, "Verifying Message Sequence Charts with the SDT Validator," *SDL '93. Using Objects. Proceedings of the Sixth SDL Forum 1993*, pp. 237–249.

Grabowski, Jens, et al., "The Standardization of Message Sequence Charts," *Proceedings 1993: Software Engineering Standards Symposium*, pp. 48–63, 1993.

Graubmann, Peter, et al., "Towards a Petri Net Based Semantics Definition for Message Sequence Charts,"*SDL 93: Using Objects*, pp. 179–190, 1993.

(List continued on next page.)

*Primary Examiner*—Paul R. Lintz
*Assistant Examiner*—Diane D. Mizrahi
*Attorney, Agent, or Firm*—Merchant, Gould, Smith, Edell, Welter, & Schmidt

[57] ABSTRACT

A method, apparatus, and article of manufacture which provides for synchronizing classes, objects, attributes, object properties, etc., in an object-oriented system. The method comprises the steps of identifying target classes, objects, attributes, object properties, etc., verifying whether the synchronization of each of the targets can proceed, and modifying the targets, wherein the target classes, objects, attributes, etc. are synchronized across the object-oriented system. The identifying step further comprises the steps of navigating the object-oriented system based on definitional relationships and ownership relationships, generating target identifiers that uniquely identify the targets, and recording the target identifiers in a linear data structure.

42 Claims, 3 Drawing Sheets

| SOURCE TYPE | NAVIGATION PATTERN $f^{-1}$ | | | | | | |
|---|---|---|---|---|---|---|---|
| | UPDATE (SELF) | ADD (ATTR) | DELETE (SELF) | INSTANTIATE (SELF) | PROMOTE (SELF) | INHERIT (SELF) | DISINHERIT (SELF) |
| ATTRIBUTE, ETC. | TDW | — | TDW | — | — | — | — |
| OBJECT, TYPED | DC | DC | SELF | — | — | — | — |
| CLASS | SELF | SELF | SELF | SELF | — | SELF | SELF |

OTHER PUBLICATIONS

Hadzilacos, Thanasis, et al., "Transaction Synchronisation in Object Bases", *Journal of Computer and System Sciences*, vol. 43, pp. 2–24, 1991.

Ito, Atsushi, et al., "Transformation Technique Between Specification in SDL and Specification in Message Sequence Charts for Designing Protocol Specifications," *Supercomm/ICC '92: Discovering a New World of Communications*, IEEE vol. 1, pp. 0442–0447, 1992.

Ladkin, Peter B., et al., "What do Message Sequence Charts Mean?", *IFIP Trans., C, Commun. Syst.*, vol. C, No. 22, pp. 301–316, 1994.

Ladkin, Peter B., et al., "Interpreting Message Flow Graphs," *Formal Aspects of Computing 1995*, vol. 7, No. 5, pp. 473–509, 1995.

Mauw, S., et al., "An Algebraic Semantics of Basic Message Sequence Charts," *The Computer Journal*, vol. 37, No. 4, pp. 269–277, 1994.

Mauw, S., et al., "A Formal Semantics of Synchronous Interworkings," *SDL '93 Using Objects: Proceedings of the Sixth SDL Forum 1993*, pp. 167–178.

Moriyasu, Kenji, et al., "A Method of Applying Message Sequence Chart Specifications for Services with Variant Process Structure," *Electronics and Communications in Japan*, Part 1, vol. 78, No. 9, pp. 12–24, 1995.

Okamoto, Mitsuhiro, et al., "A Verification Scheme for Service Specifications Described by Information Sequence Charts," *IEICE Trans. Commun.*, vol. E75–B, No. 10, pp. 978–985, Oct. 1992.

Thrampoulidis, K.X., et al., "Object Interaction Diagram: A New Technique in Object–oriented Analysis and Design," *Journal of Object–Oriented Programming*, vol. 8, No. 3, pp. 25–32, Jun. 1995.

| SOURCE TYPE | NAVIGATION PATTERN $f^{-1}$ | | | | | | |
| --- | --- | --- | --- | --- | --- | --- | --- |
| | UPDATE (SELF) | ADD (ATTR) | DELETE (SELF) | INSTANTIATE (SELF) | PROMOTE (SELF) | INHERIT (SELF) | DISINHERIT (SELF) |
| ATTRIBUTE, ETC. | TDW | — | TDW | — | — | — | — |
| OBJECT, TYPED | DC | DC | SELF | — | — | — | — |
| CLASS | SELF | SELF | SELF | SELF | — | SELF | SELF |

METHOD FOR SYNCHRONIZING CLASSES, OBJECTS, ATTRIBUTES AND OBJECT PROPERTIES ACROSS AN OBJECT-ORIENTED SYSTEM

CROSS-REFERENCE TO RELATED APPLICATIONS

This application is related to the following co-pending and commonly-assigned patent applications:

Pending application Ser. No. 08,747,414, entitled "LAYOUT METHOD FOR ARC-DOMINATED LABELLED GRAPHS," filed on same date herewith, by Subrata Mitra and Dipayan Gangopadhyay, attorney's docket number ST9-96-035;

Pending application Ser. No. 08,747,417, entitled "NOTIFICATION MANAGER FOR AN OBJECT-ORIENTED SYSTEM," filed on same date herewith, by Stephen A. Brodsky and Timothy J. Grose, attorney's docket number ST9-96-059;

Pending application Ser. No. 08,747,416, entitled "MULTI-OBJECT VIEWS IN AN OBJECT MODELING TOOL," filed on same date herewith, by Roni Korenshtein, attorney's docket number ST9-96-062;

Pending application Ser. No. 08,747,057, entitled "INTERACTIVE MODELING AGENT FOR AN OBJECT-ORIENTED SYSTEM," filed on same date herewith, by Stephen A. Brodsky and Rebecca Mei-Har Lau, attorney's docket number ST9-96-060;

Pending application Ser. No. 08,747,058, entitled "EXECUTION ENGINE IN AN OBJECT MODELING TOOL," filed on same date herewith, by Stephen A. Brodsky, Gary C. Doney, Dipayan Gangopadhyay, Michael M. Golding, Rajenda Bhagwatisingh Panwar, and Subrata Mitra, attorney's docket number ST9-96-063;

all of which applications are incorporated by reference herein.

BACKGROUND OF THE INVENTION

1. Field of the Invention

This invention relates generally to object-oriented environments, and in particular to a method for synchronizing classes, objects, attributes, and object properties across an object-oriented system.

2. Description of Related Art

In object-oriented systems, there is often a need to modify classes, objects, attributes and object properties across an object-oriented system. Current methods for modifying definitions are not necessarily structured and are often complex. Such complex methods often result in numerous errors and inefficiencies throughout the object-oriented system, and are overly inflexible. What is needed, then, is a straightforward, efficient method for synchronizing definitions across an object-oriented system. There is a further need in the art for a method that allows a user to know the scope of actions before they are taken, and to selectively apply the modifications.

SUMMARY OF THE INVENTION

To overcome the limitations in the prior art described above, and to overcome other limitations that will become apparent upon reading and understanding the present specification, the present invention discloses a method, apparatus, and article of manufacture for synchronizing object definitions in an object-oriented system. The method comprises the steps of identifying target classes, objects, attributes, object properties, etc., to be changed, checking the target classes, objects, attributes, object properties, etc., to verify that they may be changed, and modifying the target classes, objects, attributes, object properties, etc., wherein the classes, objects, attributes, object properties, etc., are synchronized across the object-oriented system In an exemplary embodiment presented herein, the identifying step further comprises the steps of navigating the object-oriented system based on definitional relationships and ownership relationships, generating target identifiers that uniquely identify the targets, and recording the target names in a linear data structure.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
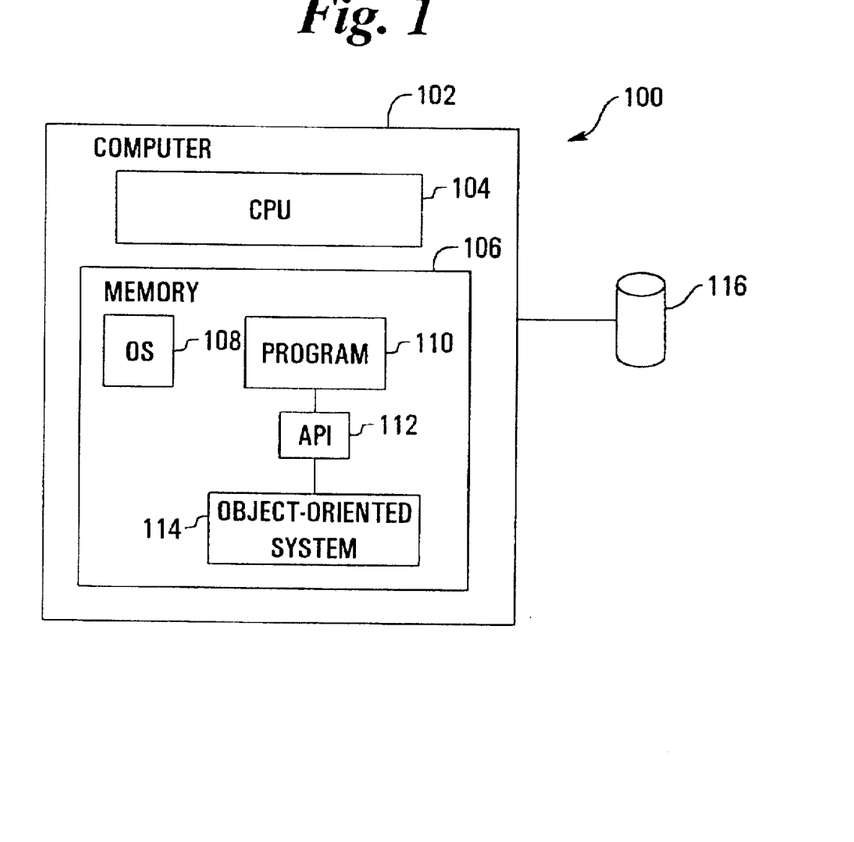
FIG. 1 illustrates an exemplary computer system that could be used to implement the present invention.

FIG. 1 illustrates an exemplary computer system 100 that could be used to implement the present invention. The computer 102 comprises a processor 104 and random access memory (RAM) 106. The computer 102 may be coupled to other devices, such as a monitor, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is preferably implemented using one or more object-oriented computer programs or applications 110 and an application programming interface (API) 112 operating under the control of the operating system 108. The computer program 110 accesses and manipulates an object-oriented system 114 stored in the memory 106 of the computer 102 using the functions provided by the API 112.

In the preferred embodiment, the operating system 108, the computer program 110, the API 112, and the object-oriented system 114 are tangibly embodied in a computer-readable medium, e.g., data storage device 116, which could include one or more fixed or removable data storage devices, such as a zip drive, floppy disc drive, hard drive, CD-ROM drive, tape drive, etc. Further, the operating system 108, the computer program 110, and the API 112 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

Synchronizing the Object-Oriented System

Figure 2:
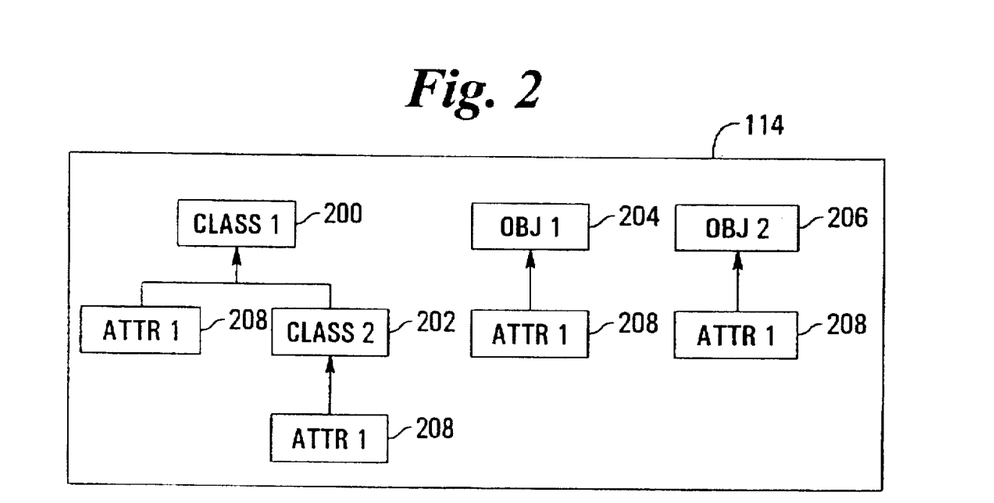
FIG. 2 is a block diagram illustrating the structure of an exemplary object-oriented system according to the present invention.

FIG. 2 is a block diagram illustrating the structure of an exemplary object-oriented system 114 according to the present invention. In the object-oriented system 114, Class2 202 is a subclass of Class1 200. Object1 (Obj1) 204 is an instance of Class1 200 and Object2. (Obj2) 206 is an instance of Class2 202.

Class1 200 and Class2 202 both include Attribute1 (Attr1) 208. Attribute1 208 is propagated to Object1 204, which is an instance of Class1 200. Attribute1 208 is also propagated to Object2 206, which is an instance of Class2 202. The attributes are identified as Class1/Attribute1, Class2/Attribute1, Object1/Attribute1, andObject2/Attribute1.

In order to change Attribute1, for example, Class1 200, Object1 204, Class2 202, and Object2 206 must be updated, so that they remain synchronized. The computer program 110, using the API 112, performs this update in three steps: Step 1 generates a list of the classes and objects having the attribute, Step 2 checks all the classes and objects on the list to be sure they can be changed, and Step 3 performs the desired change to the attribute in the listed classes and objects.

In Step 1, the computer program 110 and API 112 determine the targets which will be synchronized by the method. This step traverses the object-oriented system 114 and, using navigation functions, identifies the classes, objects, attributes, etc., for update and records the names of these identified entities in a list. By flattening the object-oriented system into a linear data structure, i.e., a list, and performing all filtering up front, the complexity of the synchronization problem is reduced to a series of simple functions.

In Step 2, the computer program 110 proceeds through the list, checking whether the operation would cause local conflicts with each identified class, object, attribute, etc. A user interface optionally queries the user at this step. If all classes, objects, attributes, etc., return an affirmative indication, then the method proceeds to Step 3.

In Step 3, the computer program 110 updates the target classes and objects by calling an API 112 command function for each class and object from the list to change the attribute. After this step, synchronization is complete.

Navigation Methods

Figure 3A:
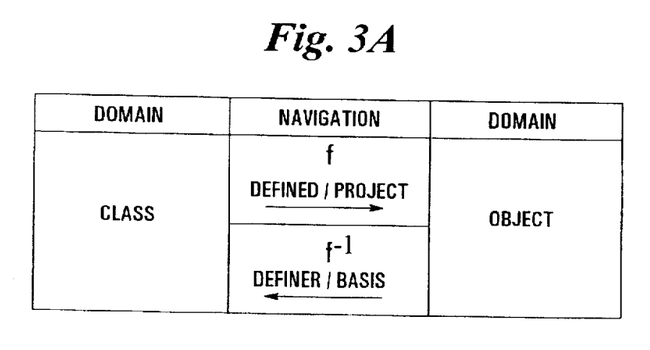
FIGS. 3A and 3B are block diagrams illustrating the navigational functions provided by the present invention.
Figure 3B:
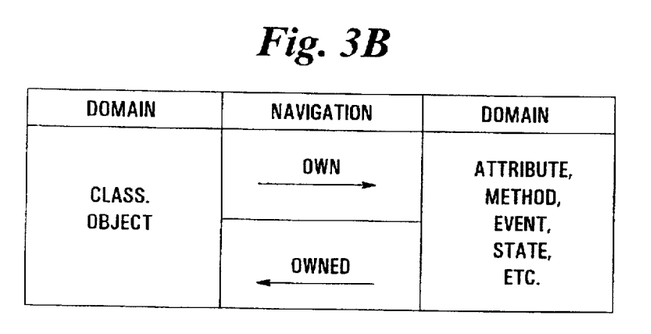

FIGS. 3A and 3B are block diagrams illustrating the navigational functions provided by the API 112. The API 112 navigation functions provide the mechanism for the computer program 110 to traverse the object-oriented system 114. The API 112 navigation functions identify all connected classes, objects, attributes, etc., using definitional and ownership relationships.

As illustrated in FIG. 3A, definitional relationships describe a defining structure that acts as a template for other structures. Classes and objects have a "defined" and "definer" relationship, wherein classes are the definers of objects and objects are defined by classes. Superclasses and subclasses have a similar relationship. The object-oriented system may be navigated from objects to the topmost superclass using the definer relationship, and from superclasses to objects by the defined relationship.

As illustrated in FIG. 3B, ownership relationships reflect control of one type of entity by another. This control is exercised through creation and deletion of an owned entity by its owner. The primary use of ownership navigation is between the class/object domains and the object property domains.

Another way to view classes and objects is from the perspective of linear algebra. Classes form a basis set that may be projected into the object domain using a projection function f. The projection may be inverted to determine the class domain from the object domain by the function $f^{-1}$. The set of classes which define a given set of objects is called the basis set. The functions f and $f^{-1}$ operate analogously to inverse functions, although they are a one-to-many mapping, wherein:

$f(class)=objects$ $f^{-1}(object)=classes$ $f(f^{-1}(object))=objects$ $f^{-1}(f(class))=classes$ The functions f and $f^{-1}$ selected for a particular navigation procedure are called the navigation pattern.

The determination of which entities are affected by an operation is based on the following steps. First, a root defining entity for the source of the change is determined by performing the $f^{-1}$ operation. Then, all entities which must be synchronized are determined using the f operation on the results. The combination of $f^{-1}$ and f construct the list of all affected entities:

$f(f^{-1}(source))=targets$

In order to navigate the object-oriented system 114, the computer program 110 selects a navigation pattern based on the characteristics of the source entity, wherein the source entity is the class, object, attribute, etc. The navigation patterns used in the present invention include a class and object property navigation pattern (TDW—Top Definers With), recursive navigation pattern (DC—Defining Class or DR—Defined Recursively) and self navigation pattern (SELF—Identity). The class and object property navigation pattern (TDW) notes the relationship between the source entity and the object-oriented system 114, finds the associated classes, objects, attributes, etc., and applies the relationship to the results. The recursive navigation pattern (DC) iterates recursively through the object-oriented system 114 to identify the target classes, objects, attributes, etc. The self navigation pattern (SELF) locates the target classes, objects, attributes, etc., in the object-oriented system 114.

Figure 4:
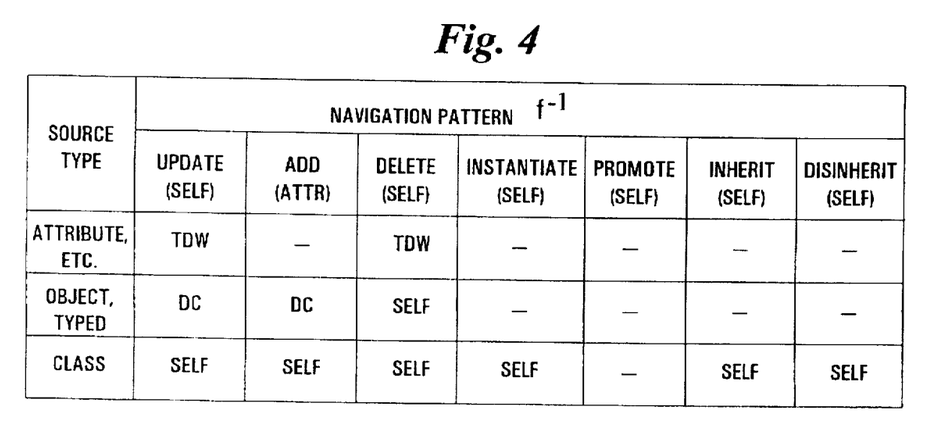
FIG. 4 is a block diagram illustrating the navigational patterns provided by the present invention.

The operation f is generally a recursive navigation pattern (DR) in these examples. The navigational pattern $f^{-1}$ is selected from the table shown in FIG. 4 by type (row) and operation (column). As shown in FIG. 4, if the source entity is an attribute, which includes an event, method, or state, then the computer program 110 executes the attribute navigation pattern (TDW) to perform set and delete functions on the attribute. If the source entity is a typed object, then the computer program 110 executes the recursive navigation pattern (DC) to perform set and add functions on the typed object and executes the self navigation pattern (SELF) to perform the delete function on the typed object. If the source entity is a class, then the computer program 110 selects the self navigation pattern (SELF) to perform set, get, add, delete, move, and find functions on the class. The entries in FIG. 4 marked with a "—" indicate the there is no pattern and the operation is not allowed.

Application Program Interface (API)

The API 112 provides the necessary functions for the computer program 110 to synchronize changes to the classes, objects, attributes, etc., across the object-oriented system 114 as illustrated in FIG. 2. Navigation functions within the API 112 are invoked to identify the list of targets. Synchronization functions within the API 112 are invoked to check the list of targets to verify they may have their definitions changed, and to modify the list of targets.

API Navigation Functions

The API 112 navigation functions are performed using the following relationships: (1) in a defining entity, from an object to a class and from a subclass to a superclass; (2) in a defined entity, from a class to an object and a superclass to a subclass; (3) in an owner, from a sub-entity to a class or object, where the sub-entity is an attribute, event, etc.; (4) in an owned entity, from a class or object to a sub-entity; and (5) in related attributes, from an attribute to another attribute via a relation.

The following describes some of the specific API 112 navigation functions invoked by the computer program 110.

The function GETDEFININGENTITY identifies the class which is the definition template for an entity. For classes, this function returns the top of the inheritance tree.

The function GETDEFININGCLASS returns the defining class.

The function LISTDEFINEDENTITIES lists the classes in the defining class.

The function LISTDEFINEDENTITIESWITHOBJECT lists the entities in the defining class.

The function LISTSUBCLASSES recursively lists all subclasses of the current class.

The function LISTSUBCLASSESWITHOBJECT lists all subclasses and entities of the current class.

The function LISTINSTANCES lists all instances of the current class. For objects, this function lists all instances of the GETDEFININGENTITY function.

The function LISTINSTANCESRECURSIVELY lists all instances of the current class and its subclasses.

The function GETOWNER returns the object container for objects and sub-entities. For classes, this function returns the superclass. This function returns "self", if at a top-level class or object, or there are no superclasses.

The function LISTOWNEDENTITIES lists all owned entities of the current class.

The function LISTRELATEDENTITIES lists all related entities of the current class.

API Command Functions

The API 112 command functions provide the mechanism for the computer program 110 to modify classes and objects in the object-oriented system 114. The API 112 command functions are a higher level internface that use the API 112 navigation functions. The following describes some of the specific API 112 command functions invoked by the computer program 110.

The GET function retrieves the value of a property of one or more classes, objects, attributes, etc. The input sequence has the name of the class, object, attribute, etc., to get information about, the type of data to retrieve, and the scope of the data.

The CHECK function determines whether an operation should be performed. In essence, the CHECK function allows a user to determine what changes to the object-oriented system 114 would occur if an API 112 command function such as SET, ADD, or DELETE were invoked. However, the changes are not actually made to the object-oriented system 114, but are reported through the output parameters. If the user invoked the actual API 112 command function after invoking the CHECK function, the output parameters would be identical, but the object-oriented system 114 would be altered.

The SET function specifies values for properties of classes, objects, attributes, etc. The input sequence has three parameters: the name of the entity to be modified, the property of the entity that is to be modified, and the new value for the property.

The ADD function creates a class, object, attribute, etc., for embedding or connecting to an existing class, object, attribute, etc. The input sequence has the name of the entity, the type of entity to add, the name of the entity to add, and the instance destination.

The DELETE function removes an entity from the object-oriented system 114.

Additional synchronization functions provided by the API 112 include instantiation and subclassing. These functions are built on the primary synchronization capabilities, wherein the instantiation function copies classes to objects and the subclassing function adds or removes inherited objects from the superclass.

Implementation of the Computer Program

Figure 5:
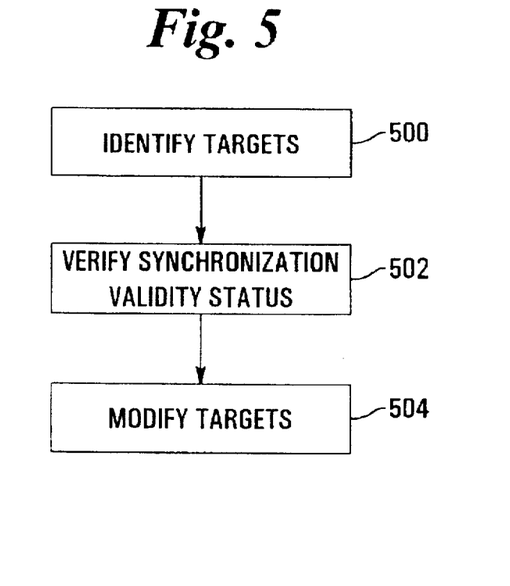
FIG. 5 is a block diagram illustrating the logic of the computer program as performed by the computer according to the present invention.

FIG. 5 is a block diagram illustrating the logic of the computer program 110 as performed by the computer 102 according to the present invention. Block 500 represents the computer 102 traversing the object-oriented system 114 and identifying the classes, objects, attributes, etc., i.e., the targets, to be updated. Block 502 represents the computer 102 checking the list of targets for synchronization validity status, i.e., whether they can be updated. In this step, the computer 102 proceeds through the list of targets and checks each class, object, attribute, etc., to determine whether the operation would cause local conflicts. The user may be asked for confirmation at this step. Block 504 represents the computer 102 performing the actual modifications to the targets, resulting in synchronization.

Figure 6:
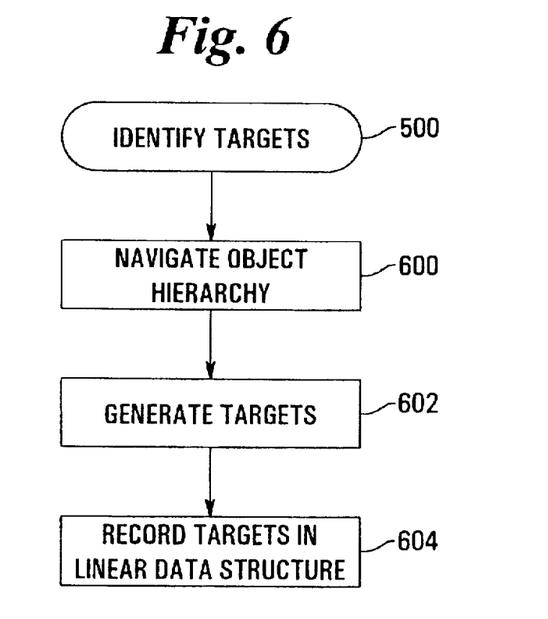
FIG. 6 is a block diagram further illustrating the logic of the computer program as performed by the computer according to the present invention.

FIG. 6 is a block diagram further illustrating the logic performed by block 500 in FIG. 5. Block 600 represents the computer 102 navigating the object-oriented system 114. Block 602 represents the computer 102 generating targets. Block 604 represents the computer 102 recording the target names in a list.

EXAMPLES

A number of examples are provided below to further illustrate the operation of the present invention. These examples include the API 112 command functions Set, Add, and Delete performed on the object-oriented system of FIG. 2.

Update Example

In a first example, suppose the type of Obj1/Attr1 needs to be changed. This requires that all the attributes are updated to a new type so that they remain synchronized. The present invention performs this update in three steps: Step 1 forms a list of the attributes, Step 2 checks all the attributes on the list to be sure they may have their type changed, and Step 3 performs the update on the listed attributes.

Step 1 identifies the objects to change using a series of API 112 navigation functions. The procedure is to find a root defining class, its subclasses, their instances, and then the attribute of the preceding set of classes and objects. The proposed navigation functions called to find the root defining class are:

The API 112 navigation function GETOWNER("Obj1/Attr1") returns "Obj1", the owner of the attribute. The relationship between Attr1 and Obj1 is available as a relative path name "./Attr1" using the GETRELATIVENAME( ) function. The root defining class is then found by the GETDEFININGENTITY("Obj1") function, which returns "Class1" as the top of the inheritance hierarchy.

The subclasses of Class1 are identified by the LISTSUBCLASSES( ) function. The full list of classes and subclasses is ("Class1", "Class2"). For each element, its instances are listed, the net effect being the function LISTINSTANCESRECURSIVELY( ), which returns ("Obj1", "Obj2"). The full set of entities is now ("Class1", "Class2", "Obj1", "Obj2").

The list of target attributes to update are now available by adding the relative path name "./Attr1" to the list above, resulting in ("Class1/Attr1", "Class2/Attr1", "Obj1/Attr1", "Obj2/Attr1"), completing the identification of the entities to update.

Step 2 performs the checking by iterating through the listed targets defined by step 1, and calling the CHECK function on each target from the list. If all objects return an affirmative indication, then the method proceeds to Step 3.

Step 3 updates the target objects by calling the SET function on each target from the list. This completes the synchronization.

Add Example

To add an attribute "Attr2" to Class1 or Obj1, the list of targets is determined in Step 1 ("Class1", "Class2", "Obj1", "Obj2"). The API 112 navigation functions used are GETDEFININGENTITY( ) followed by LISTINSTANCESRECURSIVELY( ).

Step 2 calls the CHECK function for each target of the list from Step 1 to verify the ability to add a new attribute.

Step 3 adds the attribute by invoking the ADD function for each target of the list, thereby completing the synchronization.

Delete Example

To delete the attribute "Attr1" from Class1 or Obj1, the list of targets is determined in Step 1 ("Class1", "Class2", "Obj1", "Obj2"). The API 112 navigation functions used are GETDEFININGENTITY( ) followed by LISTINSTANCESRECURSIVELY( ).

Step 2 calls the CHECK function for each target of the list from Step 1 to verify the ability to delete the attribute.

Step 3 removes the attribute by invoking the DELETE function for each target of the list, thereby completing the synchronization.

Conclusion

This concludes the description of the preferred embodiment of the invention. The present invention discloses a method, apparatus, and article of manufacture for synchronizing an object hierarchy in an object-oriented system. The method comprises the steps of identifying target objects, verifying a synchronization validity status of the target objects, and modifying the target objects, wherein the object definitions are synchronized across the object-oriented system. In an exemplary embodiment presented herein, the identifying step further comprises the steps of navigating the object-oriented system based on deterministic relationships and ownership relationships, generating target object names, wherein the target object names uniquely identify the target objects, and recording the target object names in a list.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for synchronizing elements of an object-oriented system, comprising the steps of:

identifying one or more targets to be modified in an object-oriented system stored in a computer by navigating the object-oriented system based on relationships between the targets;

verifying whether synchronization of each of the identified targets can proceed; and modifying the identified targets in the computer when the verifying step indicates that synchronization of all of the identified targets can proceed.

2. The method of claim 1, wherein the targets are selected from a group comprised of classes, objects, attributes, and object properties.

3. The method of claim 1, wherein the identifying step comprises the steps of:

generating target identifiers, wherein the target identifiers uniquely identify the targets; and recording the target identifiers in a linear structure.

4. The method of claim 1, wherein the relationships between the targets comprise definitional relationships between objects.

5. The method of claim 1, wherein the relationships between the targets comprise ownership relationships.

6. The method of claim 1, wherein the relationships are selected from a group comprising: (1) in a defining entity, from an object to a class and from a subclass to a superclass; (2) in a defined entity, from a class to an object and a superclass to a subclass; (3) in an owner, from a sub-entity to a class or object, where the sub-entity is an attribute or event; (4) in an owned entity, from a class or object to a sub-entity; and (5) in related attributes, from an attribute to another attribute via a relation.

7. The method of claim 1, wherein the navigating step comprises the steps of selecting a navigation pattern based on characteristics of a source entity, wherein the source entity is selected from a group comprising a class, object, and attribute, and navigating the object-oriented system using the selected navigation pattern.

8. The method of claim 7, wherein the navigation pattern is an attribute navigation pattern.

9. The method of claim 8, wherein the attribute navigation pattern comprises the steps of:

determining a relationship between the source entity and the object-oriented system; and identifying associated targets based on the determined relationship.

10. The method of claim 7, wherein the navigation pattern is a recursive navigation pattern.

11. The method of claim 10, wherein the recursive navigation pattern comprises the step of recursively traversing the object-oriented system to identify the targets.

12. The method of claim 7, wherein the navigation pattern is a self navigation pattern.

13. The method of claim 12, wherein the self navigation pattern comprises the step of locating the target in the object-oriented system.

14. The method of claim 1, wherein the modifying step comprises the step of selectively modifying the targets in response to operator input.

15. A computerized apparatus for synchronizing elements of an object-oriented system, comprising:

a computer having a memory;

means, performed by the computer, for identifying one or more targets to be modified in an object-oriented system stored in the computer by navigating the object-oriented system based on relationships between the targets;

means, performed by the computer, for verifying whether synchronization of each of the identified targets can proceed; and means, performed by the computer, for modifying the identified targets in the computer when the verifying step indicates that synchronization of all of the identified targets can proceed.

16. An article of manufacture comprising a program storage medium readable by a computer having a memory, the medium tangibly embodying one or more programs of instructions executable by the computer to perform method steps for synchronizing elements of an object-oriented system, the method comprising the steps of:

identifying one or more targets to be modified in an object-oriented system stored in the computer by navigating the object-oriented system based on relationships between the targets;

verifying whether synchronization of each of the identified targets can proceed; and modifying the identified targets in the computer when the verifying step indicates that synchronization of all of the identified targets can proceed.

17. The apparatus of claim 15, wherein the targets are selected from a group comprised of classes, objects, attributes, and object properties.

18. The apparatus of claim 15, wherein the identifying means comprises:

means for generating target identifiers, wherein the target identifiers uniquely identify the targets; and means for recording the target identifiers in a linear structure.

19. The apparatus of claim 15, wherein the relationships between the targets comprise definitional relationships between objects.

20. The apparatus of claim 15, wherein the relationships between the targets comprise ownership relationships.

21. The apparatus of claim 15, wherein the relationships are selected from a group comprising: (1) in a defining entity, from an object to a class and from a subclass to a superclass; (2) in a defined entity, from a class to an object and a superclass to a subclass; (3) in an owner, from a sub-entity to a class or object, where the sub-entity is an attribute or event; (4) in an owned entity, from a class or object to a sub-entity; and (5) in related attributes, from an attribute to another attribute via a relation.

22. The apparatus of claim 15, wherein the navigating means comprises means for selecting a navigation pattern based on characteristics of a source entity, wherein the source entity is selected from a group comprising a class, object, and attribute, and navigating the object-oriented system using the selected navigation pattern.

23. The apparatus of claim 22, wherein the navigation pattern is an attribute navigation pattern.

24. The apparatus of claim 23, wherein the attribute navigation pattern comprises:

means for determining a relationship between the source entity and the object-oriented system; and means for identifying associated targets based on the determined relationship.

25. The apparatus of claim 22, wherein the navigation pattern is a recursive navigation pattern.

26. The apparatus of claim 25, wherein the recursive navigation pattern comprises the means for recursively traversing the object-oriented system to identify the targets.

27. The apparatus of claim 22, wherein the navigation pattern is a self navigation pattern.

28. The apparatus of claim 27, wherein the self navigation pattern comprises the means for locating the target in the object-oriented system.

29. The apparatus of claim 15, wherein the modifying means comprises the means for selectively modifying the targets in response to operator input.

30. The article of manufacture of claim 16, wherein the targets are selected from a group comprised of classes, objects, attributes, and object properties.

31. The article of manufacture of claim 16, wherein the identifying step comprises the steps of:

generating target identifiers, wherein the target identifiers uniquely identify the targets; and recording the target identifiers in a linear structure.

32. The article of manufacture of claim 16, wherein the relationships between the targets comprise definitional relationships between objects.

33. The article of manufacture of claim 16, wherein the relationships between the targets comprise ownership relationships.

34. The article of manufacture of claim 16, wherein the relationships are selected from a group comprising: (1) in a defining entity, from an object to a class and from a subclass to a superclass; (2) in a defined entity, from a class to an object and a superclass to a subclass; (3) in an owner, from a sub-entity to a class or object, where the sub-entity is an attribute or event; (4) in an owned entity, from a class or object to a sub-entity; and (5) in related attributes, from an attribute to another attribute via a relation.

35. The article of manufacture of claim 16, wherein the navigating step comprises the steps of selecting a navigation pattern based on characteristics of a source entity, wherein the source entity is selected from a group comprising a class, object, and attribute, and navigating the object-oriented system using the selected navigation pattern.

36. The article of manufacture of claim 35, wherein the navigation pattern is an attribute navigation pattern.

37. The article of manufacture of claim 36, wherein the attribute navigation pattern comprises the steps of:

determining a relationship between the source entity and the object-oriented system; and identifying associated targets based on the determined relationship.

38. The article of manufacture of claim 35, wherein the navigation pattern is a recursive navigation pattern.

39. The article of manufacture of claim 38, wherein the recursive navigation pattern comprises the step of recursively traversing the object-oriented system to identify the targets.

40. The article of manufacture of claim 35, wherein the navigation pattern is a self navigation pattern.

41. The article of manufacture of claim 40, wherein the self navigation pattern comprises the step of locating the target in the object-oriented system.

42. The article of manufacture of claim 16, wherein the modifying step comprises the step of selectively modifying the targets in response to operator input.

* * * * *

UNITED STATES PATENT AND TRADEMARK OFFICE
CERTIFICATE OF CORRECTION

PATENT NO.    : 5,893,913

DATED         : April 13, 1999

INVENTOR(S)   : Stephen Andrew Brodsky, Timothy James Grose, and Roni Korenshtein It is certified that error appears in the above-identified patent and that said Letters Patent is hereby corrected as shown below:

Page 1, Column 2, Other Publications, please add the following cited reference:
"De Man, Jozef, et al., "Developing Format Specifications with Message Sequence Charts", <u>XIV International Switching Symposium</u>, Vol. 2, pp. 134-137, October 1992.

Signed and Sealed this

Second Day of May, 2000

*Attest:*

Q. TODD DICKINSON

*Attesting Officer*         *Director of Patents and Trademarks*